United States Patent [19]

Iino et al.

[11] Patent Number: 4,882,526
[45] Date of Patent: Nov. 21, 1989

[54] ADAPTIVE PROCESS CONTROL SYSTEM

[75] Inventors: Yutaka Iino; Takashi Shigemasa, both of Yokohama, Japan

[73] Assignee: Kabushiki Kaisha Toshiba, Kawasaki, Japan

[21] Appl. No.: 85,726

[22] Filed: Aug. 10, 1987

[30] Foreign Application Priority Data

Aug. 12, 1986 [JP] Japan .................................. 61-187750
Aug. 20, 1986 [JP] Japan .................................. 61-194578
Nov. 5, 1986 [JP] Japan .................................. 61-262952

[51] Int. Cl.$^4$ ............................................ G05B 13/04
[52] U.S. Cl. ..................................... 318/561; 364/150
[58] Field of Search ................ 318/561, 596; 364/148, 364/149, 150, 157, 161, 162, 163, 553, 579

[56] References Cited

U.S. PATENT DOCUMENTS

| | | | |
|---|---|---|---|
| 3,534,400 | 10/1970 | Dablin | 364/149 X |
| 3,535,496 | 10/1970 | Bakke | 364/157 |
| 4,214,301 | 7/1980 | Kurihara et al. | 364/150 X |
| 4,349,868 | 9/1982 | Brown | 364/157 |
| 4,358,821 | 11/1982 | Niemi | 364/148 X |
| 4,368,510 | 1/1983 | Anderson | 364/162 X |
| 4,451,878 | 5/1984 | Shigemasa | 364/162 X |
| 4,481,567 | 11/1984 | Kaya et al. | 364/157 |
| 4,527,231 | 7/1985 | Aucel et al. | 364/149 |
| 4,539,633 | 9/1985 | Shigemasa et al. | 364/162 |
| 4,663,703 | 5/1987 | Axelby et al. | 364/149 |
| 4,675,805 | 6/1987 | Freymann | 364/553 X |

OTHER PUBLICATIONS

K. J. Astrom and T. Hagglund: Automatic Tuning of Simple Regulators with Specifications on Phase and Amplitude Margins; Automatica vol. 20, No. 5, pp. 645-651 (1984).

Automatica vol. 19, No. 5, pp. 471-486: Theory and Applications of Adaptive Control, A Survey; K. J. Astrom (1983).

Primary Examiner—Bentsu Ro
Attorney, Agent, or Firm—Oblon, Spivak, McClelland, Maier & Neustadt

[57] ABSTRACT

An adaptive process control system comprises a controller of an I-P type generating a manipulating variable signal with a feed forward circuit responsive to the set-point signal r(t), an integrator responsive to a difference between a process variable signal y(t) and set-point signal r(t), and a feedback circuit responsive to the process variable signal y(t). An identification signal generator superposes a persistantly exciting identification signal h(t) to the control system. A frequency characteristic identifying circuit receives a discrete controlled data u(k) and y(k), estimates the parameters of the ARMA model by the least square method to identify the pulse transfer function, and obtains the transfer function in the continuous system as the frequency characteristics of gain and phase. A controller parameter calculating circuit calculates the controller parameters of the controller, such as integration gain K, proportional gain $f_o$, and feed forward gain $f_f$, using the frequency characteristics of gain and phase, and the overshoot, gain and phase margins, and attenuation ratio. The controller parameters are supplied via a switch to the controller.

12 Claims, 7 Drawing Sheets

ADAPTIVE PROCESS CONTROL SYSTEM

BACKGROUND OF THE INVENTION

1. Field of the Invention

This invention relates to an adaptive process control system for controlling a process according to the dynamic characteristic of the process. More particularly, this invention relates to an adaptive process control system of the type in which, when the dynamic characteristic is unknown or changes with time and operating conditions, that characteristic is estimated or identified from a response waveforms (signals) of the process, and the controller parameters in the process controller are adjusted on the basis of the estimated dynamic characteristics, so as to optimize at all times the performances of the process control system for controlling the process variable.

2. Discussion of the Background

The adaptive process control system includes the PID auto-tuning controller, the self-tuning controller (STC), the model reference adaptive control system (MRACS), and the like. In the PID auto-tuning controller and the self-tuning controller, the parameters of the dynamic characteristic model of the process under control are estimated by using a least square type parameter estimation algorithm. The controller parameters are adjusted on the basis of the estimated results so that the closed loop control system optimizes a performance index. In the MRACS, the controller parameters of the adaptive process control are adjusted so that the process operates in exactly the same way as the reference model does.

In the PID auto-tuning controller and the self-tuning controller, the stability of the control system is not considered in adjusting (calculating) the controller parameters. Therefore, in some types of processes, the controlled variables of the process do not converge to the set-point, but contradistinctively diverse from it, resulting in the instability of the control system. In the MRACS, such a design is possible as to provide a stable process control system. To this end, many requirements are needed: the dead time, the highest order, and a difference between the pole and zero point (a difference of number of articles) must be known; the process must be minimum phase system. Actually, however, it is almost impossible to find the processes satisfying such requirements. Therefore, it is safe to say that this process control system is theoretically good, but bad in practice. Consequently, it is impossible to use the MRACS for a real plant to realize the stable process control system.

These types of adaptive process control systems are effective in controlling the process whose dynamic characteristic slowly varies, but ineffective in controlling the process whose dynamic characteristic rapidly varies. Specifically, in these control systems, the controller parameters can follow the slow variation of the dynamic characteristic so as to optimize the control system at all times. These control systems can not follow the quick variation of the dynamic characteristics, so that the control system is temporarily unstable in operation. Incidentally, examples of the rapid variation of the dynamic characteristic are rapid variations of the gain- and/or phase-frequency characteristics.

Additionally, when the low frequency drift disturbance is added to the control system or the measurement of the process variable signal suffers from noise, that disturbance or noise misleads the estimation of the dynamic characteristics of the control systems. The result is an erroneous adjustment of the controller parameters, possibly leading to an instable operation of the control system.

As described above, in the conventional adaptive process control system, the control system is sensitive to the nature of the process, the rapid change of the dynamic characteristic of the process, the drift disturbance, measuring noise, and the like.

In the process control system, for controlling temperature, flow rate (speed), pressure and the like of the plant, it is a common practice to construct the adaptive control system by appropriately combining various types of compensation modes, such as the proportional control (P) action, the integration control (I) action, and the derivative control (D) action. For example, in the PID control system, the controlling signal u(t) is obtained by the following PID formula $$u(t) = C_0 \int e(t)dt + C_1 e(t) + C_2 \cdot de(t)/dt \qquad \text{(B-1)}$$

where e(t) is a difference between a set-point r(t) and a process variable signal y(t), and $C_0$ and $C_2$ are the integration gain, the proportional gain, and the derivative gain as controller parameters, respectively.

In the I-PD control system, the controlling signal u(t) is obtained by the following I-PD formula $$u(t) = K \int e(t)dt - f_0 y(t) - f_1 \cdot dy(t)/dt \qquad \text{(B-2)}$$

where K, $f_0$, and $f_1$ are the integration gain, the proportional gain, and the derivative gain as controller parameters, respectively.

In the adaptive control system, these controller parameters must be properly selected according to the dynamic characteritics of the process. One known method for selecting the controller parameters, which is available for both the PID control system and I-PD control system, is "The Design of a Control System on the Basis of the Partial Knowledge of a Process" by Toshiyuki Kitamori, Transactions of the Society of Instrument and Control Engineers, vol. 15, No. 4, pp. 549 to 555, August 1979. This approach is very useful in that the controller parameters of the control system can be obtained by using a simple formula from a denominator type transfer function of the process and the reference model representing the desirable characteristic of the control system.

In this approach, however, the gain margin and the phase margin are not considered in design. Therefore, the approach is unsatisfactory in designing control system for the process which has the step response of the overshoot or the reverse response. Further, the controller parameters as selected does not always ensure a stability of the control system.

When considering the PID control system alone, the design using the Bode diagram considering the gain margin and the phase margin has been well known. This method is based on the trial and error approach, and can not set the gain margin and the phase margin exactly satisfying the specifications of the control system. Therefore, it depends largely on the empirical knowledge. For example, in the process control system, the phase margin is 16° to 80°; and the gain margin is 3 to 9 dB. In a servo control system, the phase margin is 40° to 65° and the gain margin is 12 to 20 dB. Thus, these control systems employ relatively wide margins for these controller parameters. Therefore, the stability of the control system can be ensured, but it is unknown in the design stage whether or not the response waveform of the control system is the intended one. Therefore, preceding with the design, the designer constantly checks the response waveform whether or not it is the desired one, by gradually changing the gain margin and the phase margin. Thus, the designer must design the control system in the trial and error manner. For this reason, if this design method is used, it is impossible to automatically set the controller parameters.

As described above, the conventional controller parameter setting methods for the process control system can not exactly set the controller parameters which satisfy the desired characteristic of the control system for every type of compensating actions, such as PID, I-PD or 2 degree-of-freedom PID controller, and the lead/lag compensator. Therefore, a stability of the process control system cannot be anticipated before it is designed.

The known methods to measure the transfer function representing the dynamic characteristic of the process are the method using the servo analyzer, the correlation method, and the method in which parameters of an ARMA (autoregressive movement average) model are estimated using the method of least squares.

In the servo analyzer method, a sine wave signal as the identification signal is superposed on the controlling signal to the process. When the process is in a stationary state, an amplitude ratio of the input (controlling or manipulating variable) to the process and the output (process variable) from the process, and a phase difference between the input and the output are checked as the characteristics of the frequency. In this way, the frequency characteristics relating to the gain and phase of the process are measured.

In this method, the sine wave signal is input to the process for a long time, and the measurement is performed with the open loop. Therefore, it is difficult to apply it to the actual process.

In the correlation method, a white noise signal containing many frequency components is used for the identification signal to be superposed on the controlling signal to the process. The power spectrum ratio is obtained using a ratio of the auto-correlation function of the input and that of the output. The power spectrum ratio is used for obtaining the frequency characteristics of gain and phase of the process.

This method uses the identification signal containing many frequency components. Therefore, the method is superior to the servo analyzer method in that the measuring time is short. However, it is disadvantageous in that the amount of data to be processed is great, and that the frequency characteristics obtained are not exact.

The ARMA model method is a systematic method which can measure the dynamic characteristic of the process even under the closed loop control, if the identification conditions are satisfied. In this respect, this method has widely been used in recent days. If $e^{j\omega\tau}$ is substituted into the time shift operator Z of the pulse transfer function, the pulse transfer function is transformed into the transfer function of the continuous system. The pulse transfer function is defined for the hold data for each sampling period. Therefore, in the vicinity of the Nyquist frequency, the gain and phase are apparently shifted due to the adverse effect of the sampling. Therefore, the pulse transfer function suffers from more errors than the transfer function in the continuous system. In designing the control system in the continuous system, the shift of gain and phase due to the sampling makes it difficult to design a limit for the control system since the shift occurs in high frequencies.

SUMMARY OF THE INVENTION

Accordingly, an object of this invention is to provide an adaptive process control system which can adjust the controller parameters so as to keep the stable operation of the control system against a rapid variation of the dynamic characteristic of the process in a certain range, the drift disturbance, and the noise irrespective of a characteristic of a process.

Another object of this invention is to provide a controller parameter calculating device in use for an adaptive process control system which allows a designer to select the controller parameters for various compensation modes, so as to satisfy a desired characteristic of the control system, and ensures the stable operation of the control system.

Yet another object of this invention is to provide a transfer function measuring device in use for an adaptive process control system, which can obtain the exact transfer function of the continuous system and its frequency characteristic from the identified pulse transfer function which is obtained by estimating the parameters of the ARMA model using the least square method.

According to this invention, there is provided an adaptive process control system comprising a controller with controller parameters for generating a manipulating variable signal which controls a process variable signal of a process according to a set-point signal, the process variable signal, and the controller parameters, identification signal generating circuit for supplying a persistently exciting identification signal to either the set-point signal or the controlling signal, frequency characteristic identifying circuit which estimates an autoregressive moving average model of the process from sampling data of the process variable signal and sampling data of the manipulating signal by using a least square method, during a period in which the identification signal generating circuit generates the identifying signal, identifies a pulse transfer function of the process, and obtains a frequency characteristics of gain and phase of the process based on the pulse transfer function, and control parameter calculating circuit for adjusting the controller parameters so that the frequency characteristics of gain and phase of the process satisfy predetermined gain and phase margins.

DETAILED DESCRIPTION OF THE PREFERRED EMBODIMENTS

An embodiment of an adaptive process control system according to this invention will be described, referring to the accompanying drawings.

Figure 1:
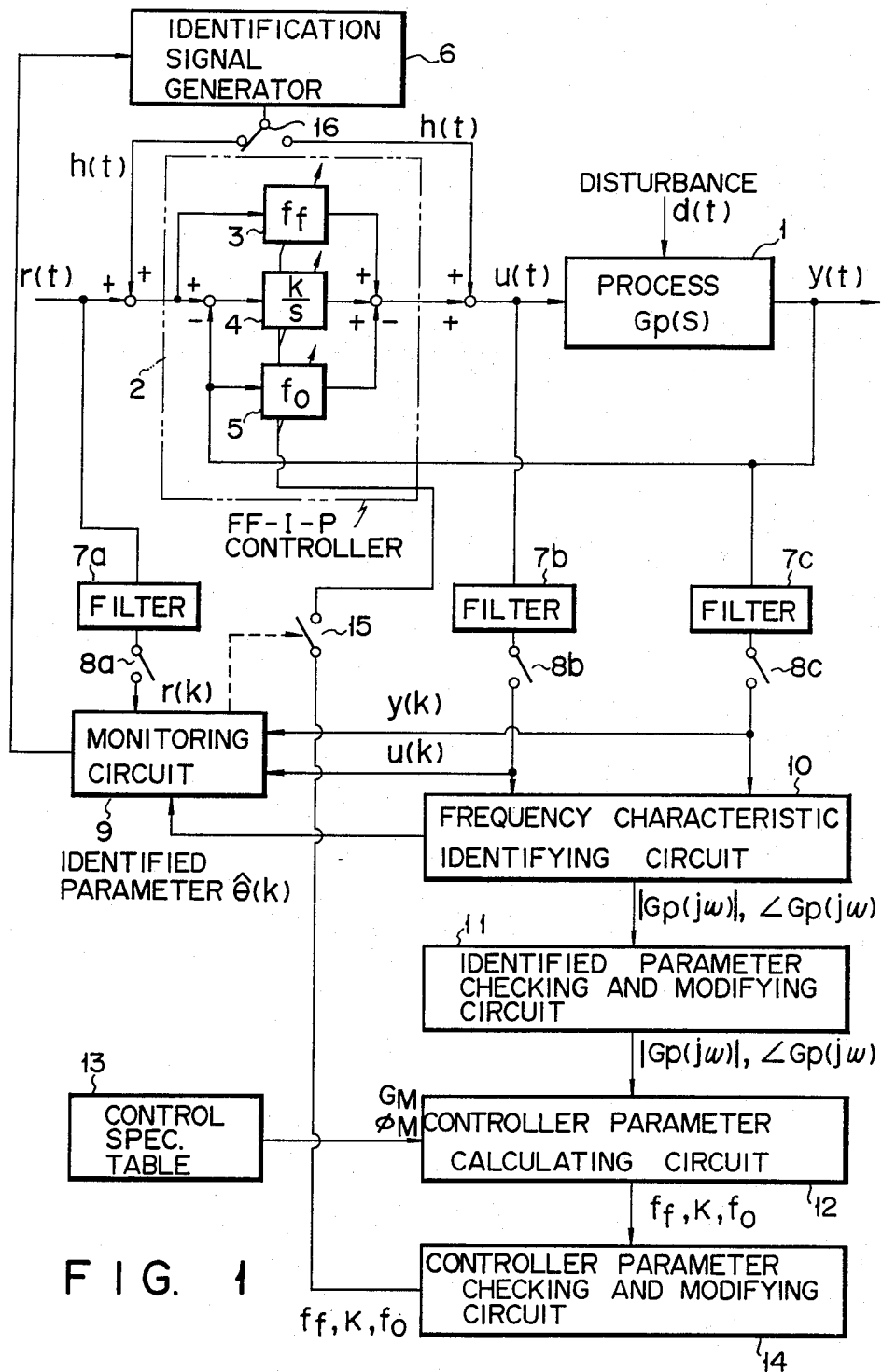
FIG. 1 shows a block diagram of a first embodiment of an adaptive process control system according to this invention.

FIG. 1 shows a block diagram of a first embodiment of this invention.

Process 1 with a transfer function Gp(s) is controlled by controlling signal (manipulating signal) u(t). The actually controlled items are temperature, flow rate, pressure, etc., of the process, and these are output as process variable signals (process variable) as generally expressed by y(t). Controller 2 is coupled with the input of process 1. Controller 2 calculates manipulating signal u(t), using a difference between the process variable signal y(t) output from process 1 and set-point signal r(t). Signal generator 2 is an FF-I-P controller which is one of the two degrees of freedom PID controller with a feed forward made up of feed forward circuit 3 responsive to only set-point signal r(t), integrator 4 responsive to a difference between controlled signal y(t) and set-point signal r(t), and feedback circuit 5 responsive to only conrolled signal y(t). Signal generator 2 can be used as a controller equivalent to P-I controller by adjusting feed forward gain $f_f$. The I-P controller is insensitive to the disturbance, and the P-I controller has a good follow-up for the set-point. Therefore, in the case of the adaptive control system, the disturbance restriction performance and the set-point follow-up performance, as the characteristics of the control system, can both be optimized. This type of control system is called a two degrees of freedom control system.

In case that the control system is of the closed loop type, when the dynamic characteristic of the control system is identified depending on the signal and the controlled signal of the process, the process must be excited by providing an excitation to the control system from the exterior in order to satisfy the identifiability condition. It is for this reason that identification signal generator 6 is provided. An identification signal h(t) generated from signal generator 6 is superposed on a set-point signal r(t) as the input signal to the controller 2, or the manipulating signal u(t) as the output of the same. The identification signal h(t) currently used is a persistently exciting signal such as a Maximum Length Sequence (M-series) signal, a rectangular wave signal, and a pulse signal.

The set-point signal r(t), manipulating signal u(t), and the process variable signal y(t) are supplied through filters 7a, 7b and 7c to samplers 8a, 8b and 8c, respectively. By the samplers, these signals are sampled at fixed periods, and converted into discrete time data r(k), u(k) and y(k).

The data u(k) and y(k) are input to frequency characteristic identifying circuit 10. The circuit 10 estimates the parameters of the ARMA (autoregressive moving average) model by using the least square method, and identifies the pulse transfer function of the process on the basis of the estimation, and finally obtains from the pulse transfer function, the frequency characteristics of gain and phase of the corresponding transfer function in the continuous system.

The frequency characteristics of gain and phase are transferred to identified parameter checking/modifying circuit 11 which in turn checks as to whether the frequency characteristics are proper or improper.

The checked/modified frequency characteristics are transferred to control parameter calculating circuit 12. The operator selects the reference model having a desired overshoot and attenuation ratio suitable for the control system. This circuit 12 also receives the gain margin and the phase margin of the selected model from control specification format 13. The circuit 12 calculates the controller parameters of controller 2. In this case, the controller parameters include integration gain K, proportional gain $f_o$, and feed forward gain $f_f$. The controller parameters are supplied to controller parameter checking/modifying circuit 14. The circuit 14 checks as to whether the obtained controller parameters are proper or not. The checked/modified controller parameters are supplied through switch 15 to controller 2.

The discrete data r(k), u(k), and y(k), and the parameters $\hat{\theta}(k)$ of the ARMA model identified by frequency characteristic identifying circuit 10 are also supplied to monitoring circuit 9. This circuit 9 does not start the tuning start-up and the calculation of the controller parameters until these satisfy a predetermined condition. In other words, the circuit 9 drives identification signal generator 6 and frequency characteristic identifying circuit 10 to start tuning. The circuit 9 stops the drive of circuits 10 and 6 in accordance with the convergence of parameter $\hat{\theta}(k)$ and starts to calculate the controller parameters. At the same time, the controller parameters can be set to controller 2 by connecting switch 15.

The operation of the first embodiment as mentioned above will be described. To start with, frequency characteristic identifying circuit 10 identifies the dynamic characteristic of process 1. The circuit 10 fetches the discrete time data u(k) and y(k) of the controlling and controlled signals, and applies the data to the ARMA model as given below.

$$y(k) + a_1 y(k-1) + \ldots + a_n y(k-n) = \quad (1)$$
$$b_1 u(k-1) + b_2 u(k-2) + \ldots + b_m u(k-m)$$

The parameters $\{a_i\}$ and $\{b_j\}$ (i=1 to n, j=1 to m, and n and m are proper integers) of this model are estimated using the method of least squares as described below.

Step 1

Assuming that of the integers n and m, the larger one is L, we have, $$L = \max(n, m) \quad (2)$$

A matrix $(n+m) \times (n+m)$ is $\Gamma(L-1) = \alpha I$, where I indicates a unit matrix, and $\alpha$ is a positive large integer. Additionally, the initial value of the estimation parameter of (n+m) dimension is $\theta(L-1) = [0 \ldots 0]^T$. Further, $0 < \lambda \leq 1$ (e.g., $\lambda = 0.99$), and K=L.

Step 2

The sequence of steps (a) to (e) as given below is executed until K=N holds (N>>L).

(a) The measured data vector $\phi(k)$ of manipulating signal data u(k) and the process variable signal data y(k) is prepared.

$$\phi(k) = [-y(k-1), -y(k-2)\ldots, -y(k-n), \quad (3)$$
$$u(k-1), u(k-2), \ldots u(k-m)]^T$$

The estimation parameter vector $\theta(k)$ is calculated by using the following equations (4) to (6) according to the least-square-method.

$$(b)\; \epsilon^*(k) = \{y(k) - \theta^T(k-1)\cdot\phi(k)\}/ \quad (4)$$
$$\{\lambda + \phi^T(k)\cdot\Gamma(k-1)\cdot\phi(k)\}$$

$$(c)\; \theta(k) = \theta(k-1) + \Gamma(k-1)\cdot\phi(k)\cdot\epsilon^*(k) \quad (5)$$

$$(d)\; \Gamma(k) = 1/\lambda\,[\Gamma(k-1) - \{\Gamma(k-1)\cdot \quad (6)$$
$$\phi(k)\cdot\phi^T(k)\cdot\Gamma(k-1)\}/\{\lambda+\phi^T(k)\cdot\Gamma(k-1)\cdot\phi(k)\}]$$

(e) Let K+1 be k, and the control is returned to step (a).

Step 3

If the following relation holds, $$|\theta(N) - \theta(N-N_0)|/|\theta(N)| < \epsilon_\theta (0<\epsilon_\theta <<1)\,(N_0\geq 1)$$

$\theta(N)=[a_1, a_2, \ldots a_n, b_1, b_2, \ldots b_m]$ is used as the estimated parameter in the equation (1). If the above relation does not hold, using K=L again, step 2 is executed. As a result, the N number of the measuring data are arranged a plurality of times in the time axial direction. In this case, if the number N of data is small, the repetition of data apparently increases the number of data. The result is that the error influence upon the initial value is reduced, and the estimation parameter $\theta$ is quickly converged to near the real value. In the above formula, $\epsilon_\theta$ is a threshold value to check the convergence of the estimation parameter. $|\theta|$ means the Euclidean norm and is given $$|\theta| = \sqrt{a_1^2 + a_2^2 + \ldots a_n^2 + b_1^2 + b_2^2 + \ldots b_m^2} \quad (7)$$

As a result, the dynamic characteristic of process 1 can be described in the form of the following pulse transfer function model, using the parameters of the estimated ARMA model.

$$Gp(Z^{-1}) = (b_1 Z^{-1} + b_2 Z^{-2} + \ldots + b_m Z^{-m})/ \quad (8)$$
$$(1 + a_1 Z^{-1} + a_2 Z^{-2} + \ldots + a_n Z^{-n})$$

The frequency response function Gp(jw) of process, i.e., the transfer function in the continuous system, is obtained from the pulse transfer function $Gp(Z^{-1})$, through the following process. Actually, the gain characteristic $|Gp(j\omega)|$ and the phase characteristic $\angle Gp(j\omega)$ are obtained. The procedure to obtain this follows.

The transfer function in the continuous system is obtained by substituting $e^{j\omega\tau}$ into the time shift operator Z of the pulse transfer function $Gp(Z^{-1})$. In other words, for a frequency $\omega$, obtaining the following complex and substituting it into $G(Z^{-1})$ suffices.

$$Z=e^{j\omega}=X+jY \text{ (j indicates the imaginary part of complex)} \quad (9)$$

Additionally, a transfer function for compensation $\Delta(j\omega, Z)$ is used for removing the influence by the sampling in samplers 8a, 8b, and 8c. With t for the sample period of samplers 8a, 8b, and 8c, the following complex is obtained.

$$Gp(j\omega) = \Delta(j\omega,z)\cdot Gp(Z^{-1})\,|Z=e^{j\omega\tau} \quad (10)$$
$$= \{(A\cdot B)/(j\omega\tau)\}\cdot Gp(Z^{-1})\,|Z=e^{j\omega\tau}$$
$$= gx + j\cdot gy$$

where $A = \left\{1 + j\omega\tau + \dfrac{(j\omega\tau)^2}{3}\right\}$ $B = Z - 3 + 3Z^{-1} - Z^{-2}$, as the parameters of compensation transfer function $\Delta(j\omega, Z)$. In this case, the gain-frequency characteristic and the phase-frequency characteristic for a frequency $\omega$ [rad/sec] are given by The gain-frequency characteristic $|Gp(j\omega)| = \quad (11)$ $$\sqrt{gx^2 + gy^2}$$

The phase-frequency characteristic $\angle Gp(j\omega) = \quad (12)$ $$\tan^{-1}(gy/gx)$$

These pieces of data are transferred to identified parameter checking/modifying circuit 11. The circuit 11 checks as to whether the estimated dynamic characteristics of process 1 are proper or not, and if necessary, modifies them. The modification will be performed under the following rules.

A stationary gain of process 1 is calculated using $$g_o = Gp(Z^{-1})|Z=1 \quad (13)$$

If the following relation holds $$g_{o\,min} \leq g_o \leq g_{o\,max} \quad (14)$$

where $g_{o\,max}$ and $g_{o\,min}$ are the maximum and minimum values of a predetermined stationary gain of process 1, it is decided that the estimation of $Gp(Z^{-1})$ of the equation (1) is correct. If not so, it is decided that the parameter estimation by the least-squares method failed. And the estimation of $Gp(Z^{-1})$ is executed again. The gain and phase characteristics which are represented by the identified parameter as decided to be proper are supplied to controller parameter calculating circuit 12.

Control specification format 13 contains the reference model numbers, overshoot amount, gain margins, phase margins, and attenuation ratios, as shown in the following table. Here, the attenuation ratio is a ratio of peak values of successive peaks in the step response waveform.

| Reference Model No. | Overshoot Amount | Gain margin GM | Phase margin $\phi_M$ | Attenuation ratio |
|---|---|---|---|---|
| 1 | 0% | 19.08 dB | 71.3° | 0.1 |
| 2 | 1 | . | . | . |
| . | . | . | . | . |
| . | . | . | . | . |

-continued

| Reference Model No. | Overshoot Amount | Gain margin GM | Phase margin $\phi_M$ | Attenuation ratio |
|---|---|---|---|---|
| . | . | . | . | . |
| n | 10 | 12.4 | 60.5 | 0.2 |

An operator selects a preferable reference model referring to tolerable overshoot amount and attenuation ratio, and he designates its number. Then, the corresponding gain margin GM and phase margin $\phi M$ are applied to controller parameter calculating circuit 12. This circuit 12 executes the following procedural steps 1 to 6, to calculates the controller parameters of controller 2, such as integration gain K, proportional gain $f_o$, and feed forward gain $f_f$.

Step 1

To find the frequency $\omega_{180}$ satisfying $$\angle Gp(j\omega) = -180°$$

To find the frequency $\omega_{90}$ satisfying $$\angle Gp(j\omega) = -90°$$

Step 2

To set a design frequency as $\omega p = \omega o$.

Step 3

To obtain the proportional gain $f_o$ and the integration gain K using the following expressions $$f_o = [\tan \phi_M \cdot \sin\{-\angle Gp(j\omega p)\}/|Gp(j\omega p)|] - \quad (15)$$
$$[\cos\{\angle Gp(j\omega p)\}/|Gp(j\omega p)|]$$

$$K = \omega p \cdot \sin\{-\angle Gp(j\omega p)\}/\{\cos \phi_M \cdot |Gp(j\omega p)|\} \quad (16)$$

Step 4

To find $\omega_G$ satisfying the following expression $$f_o + \cos\{\angle Gp(j\omega_G)\}/|Gp(j\omega_G)| = 0 \quad (17)$$

in the range of $\omega p < \omega_G < \omega_{180}$.
To calculate $$G_M(\omega_G) = |Gp(j\omega_G)| \cdot K/[\omega_G \cdot \sin\{-\angle Gp(j\omega_G)\}] \quad (18)$$

Step 5

If the following relation holds $$|G_M(\omega_G)| < 10^{-\frac{GM}{20}} \quad (19)$$

then go to step 6, else $\omega p \leftarrow \omega p \times 0.9$, and then $\omega p$ is gradually decreased, and the control is returned to step 3.

Step 6

To obtain the feed forward gain $f_f$ by using the following expression $$f_f = K \cdot \beta \cdot \omega p^{-1} \quad (20)$$

where $\beta$ = constant in the range between 0.0 and 0.5.

Figure 2:
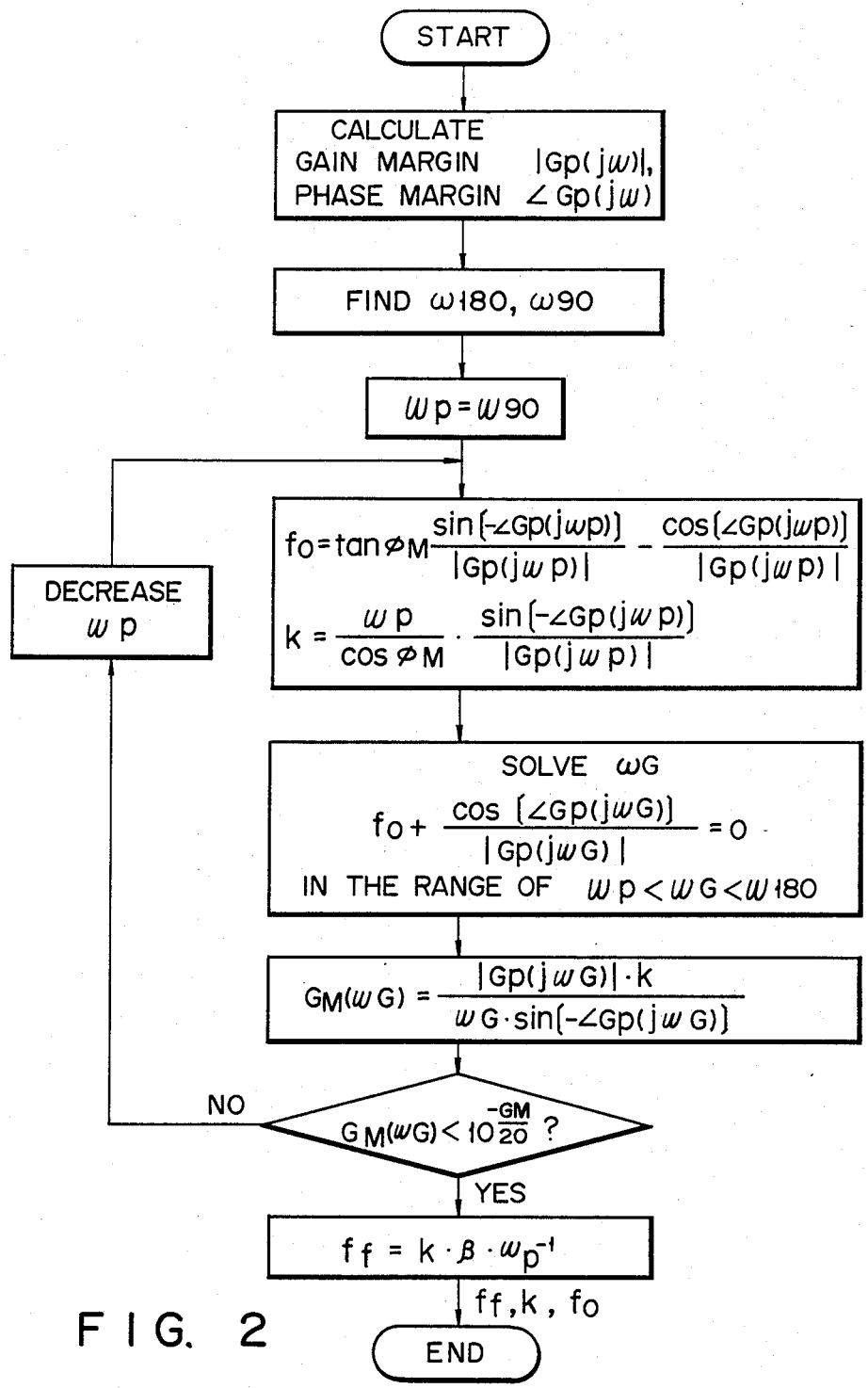
FIG. 2 shows a flowchart describing a flow of calculating steps to determine controller parameters, which is performed in the first embodiment.

The algorithm of controller parameter calculating circuit 12 as mentioned above is charted in FIG. 2. The control system controlled by the controller parameters thus calculated, $f_f$, K and $f_o$, satisfy the gain margin, GM and the phase margin $\phi_M$. The calculated parameters are supplied to controller parameter checking/modifying circuit 14. The circuit 14 checks the properness of the parameters $f_f$, K, and $f_o$ under the following rules, and if necessary, modifies them.

If $f_f < f_f \text{min}$, $f_f = f_f \text{min}$
If $f_f > f_f \text{max}$, $f_f = f_f \text{max}$
If $k < k_{min}$, $k = k_{min}$
If $k > k_{max}$, $k = k_{max}$
If $f_o < f_o \text{min}$, $f_o = f_o \text{min}$
If $f_o > f_o \text{max}$, $f_o = f_o \text{max}$ The controller parameters $f_f$, k, and $f_o$ as checked and modified are sent to controller 2, according to a command from monitoring circuit 9. Thus, the controller parameters of generator 2 are adjusted.

Monitoring circuit 9 checks the following rules at fixed periods, and when these are satisfied, the circuit 9 starts the calculation of controller parameters and the tuning start-up (to start up the inputting of the identification signal h(t) to the control system and to operate identifying circuit 10). The identification signal h(t) is input to the set-point signal r(t) or manipulating signal u(t) by switching selector 16. While constantly monitoring the amplitude of the control deviation of e(k)=r(k)−y(k), when it exceeds the threshold value, viz., $|e(k)| > \epsilon_1$, the following two rules are checked. Incidentally, the identification signal can be superposed on the manipulating signal u(t) or the set-point signal r(t) by selector 16.

Tuning start-up rule 1

To start up the tuning, if $$E_1 = \sum_{i=k}^{k+N_1} |e(k)| > \epsilon_2$$

Tuning start-up rule 2

To start up the tuning, if $$|e(k)| > \epsilon_3$$

occurs $N_2$ times or more during the period from time k to $k+N_2$. At the time of starting up the tuning, if a rate $\bar{r}$ of change of set-point satisfies the following relation, $$\bar{r} = (1/Nr) \sum_{i=k}^{k+Nr} |\{r(k) - r(k-1)\}/r(k)| < \epsilon_r$$

identification signal generator 6 generates the identification signal of M-series, for example, i.e., a persistently exciting signal. The amplitude of the signal depends on the value of $\bar{r}$. The basic period of the M-series is an integer times the sampling period $\tau$.

Upon starting up of the tuning, these respective circuits 10, 11, 12 and 14 successively execute the above-mentioned processes. As a result, the parameters $f_f$, k and $f_o$ of controller 2 are adjusted to new values. In this way, the adaptive control is performed.

Figure 3A:
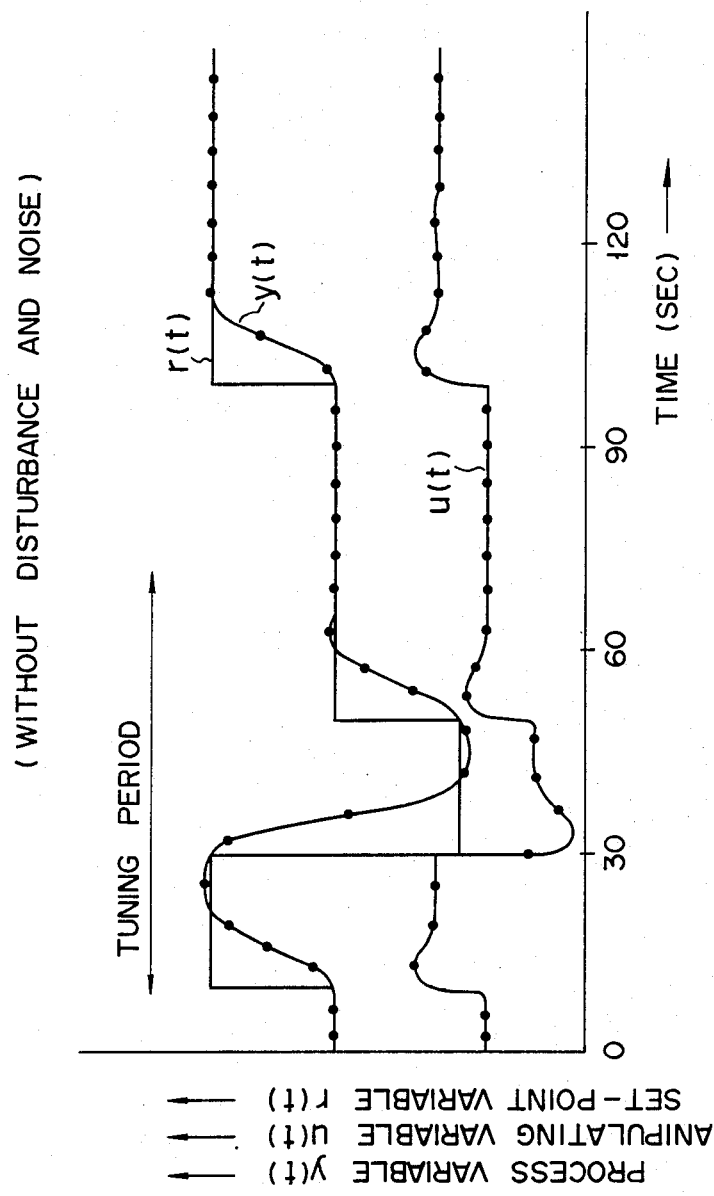
FIGS. 3A and 3B show graphs the response waveforms of the first embodiment when the disturbance is absent and it is present.
Figure 3B:
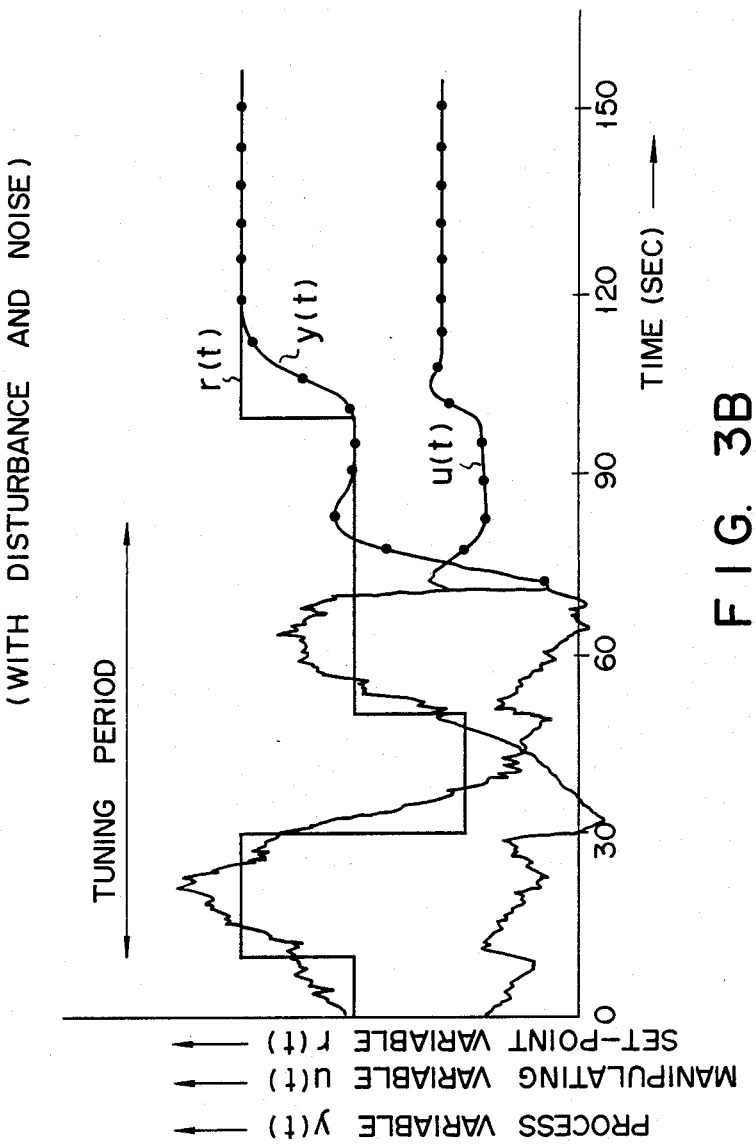

FIGS. 3A and 3B show the results of the control response of an experimental process when it is controlled by using an adaptive control system according to this invention. FIG. 3A shows the control response when the process is controlled without disturbance and/or noise. FIG. 3B shows that when the process is controlled under disturbance and/or noise. In the experimental control, during the tuning period, the set-point r(t) is varied in a rectangular fashion and the tuning is executed. Then, the set-point r(t) is varied step-wise. As seen from these figures, the controlled signal y(t) quickly follows up the variation of the set-point r(t), and the control system is well tuned.

While the first embodiment relates to the I-P control system with the feed forward or the P-I control system, this invention is applicable for the PI control system, the PID control system, the I-PD control system, the I-PD control system with feed forward, and the like. The embodiment is a one-variable control system with one process variable (signal), but this invention is applicable for a multi-variable control system with a multiple of process variables. In the identified parameter checking/modifying circuit 11, controller parameter checking/modifying circuit 14, and monitoring circuit 9, the two-valued logic for deciding the check result may be replaced by the Fuzzy logic.

According to the first embodiment, the controller parameters are adjusted so as to keep a predetermined stability (gain margin and phase margin). Therefore, the control system satisfactorily absorbs the adverse influence by the variation of the dynamic characteristic of the process. Therefore, the control by the embodiment can follow up a rapid variation of the dynamic characteristic of the process which are uncontrollable by the adaptive control compensation action. The control is stable independently of the dynamic characteristics of the process.

The dynamic characterisics are identified as the frequency characteristics of gain and phase. The design of the control system is based on the identification. In designing the control system, this eliminates the need for considering the dead time and the order of the control system, the condition of the minimum phase system, which are required for MRACS, etc. Thus, no restriction for the process is required, and therefore, the systematic and automatic design of the control system is realized.

In calculating the controller parameters, the control system is designed so as to have the same gain and phase margins as those of the reference model. This allows the operator to appropriately designate the specifications concerning the transient response of the control system, such as the overshoot amount, and the attenuation ratio. In designing the controller parameters, the frequency characteristics (gain and phase characteristics) are considered only for the angular frequency ($\omega$) range of 90° to 180° in the vicinity of the cut-off frequency. Therefore, the dynamic characteristic of the process can be identified free from the error which arises from the low frequency drift disturbance and high frequency measuring noise. As a result, the realized control system is insensitive to the drift disturbance or noise.

Figure 4:
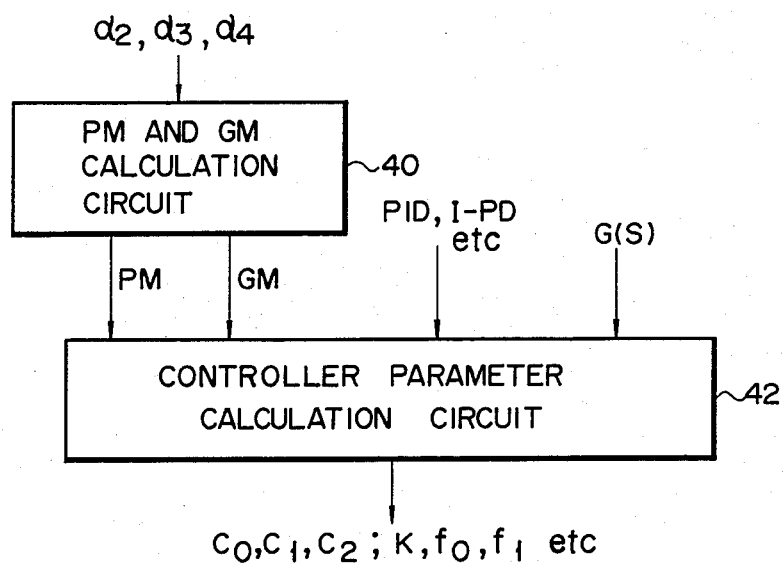
FIG. 4 shows a block diagram of a second embodiment of an adaptive process control system according to this invention.

The description to follow is details of a second embodiment of this invention. In FIG. 4, there is shown in block form a key part of the second embodiment, which is for calculating the controller parameters. In the first embodiment, the gain margin and the phase margin are previously selected depending on the specifications concerning the transient response of a desired control system, such as overshoot amount and attenuation ratio, and prestored in table 13. In the second embodiment, the characteristic coefficients $\alpha_2$, $\alpha_3$, and $\alpha_4$ of the reference model exhibiting a desired response are input to phase margin and gain margin calculation circuit (first calculating circuit) 40, where the phase and gain margins are calculated. While the first embodiment can calculate only some specific controller parameters of the control system, controller parameter calculation circuit (second calculating circuit) 42 in the second embodiment can calculate the integration, proportional, and derivative gains $C_0$, $C_1$, and $C_2$ in the PID control system or those K, $f_o$, and $f_1$ and feedback gain $f_f$ in the I-PD control system, in accordance with the compensation mode of the control system. Specifically, controller parameter calculation circuit 42 receives the phase and gain margins $\phi_M$ and GM calculated by calculation circuit 40, the compensation mode information for indicating whether the control system is of the PID type or the I-PD type, and the transfer function G(S) of the control system, and works out the controller parameters $C_0$, $C_1$, and $C_2$, or K, $f_o$ and $f_1$.

It is assumed that the reference model Gm(S) exhibiting a desired characteristic of the control system is given by $$Gm(S) = \frac{1}{1 + \sigma S + \alpha_2(\sigma S)^2 + \alpha_3(\sigma S)^3 + \alpha_4(\sigma S)^4} \quad (21)$$

where S is a derivative operator, and $\alpha$ is a coefficient relating to the rise time of the step response.

Figure 5:
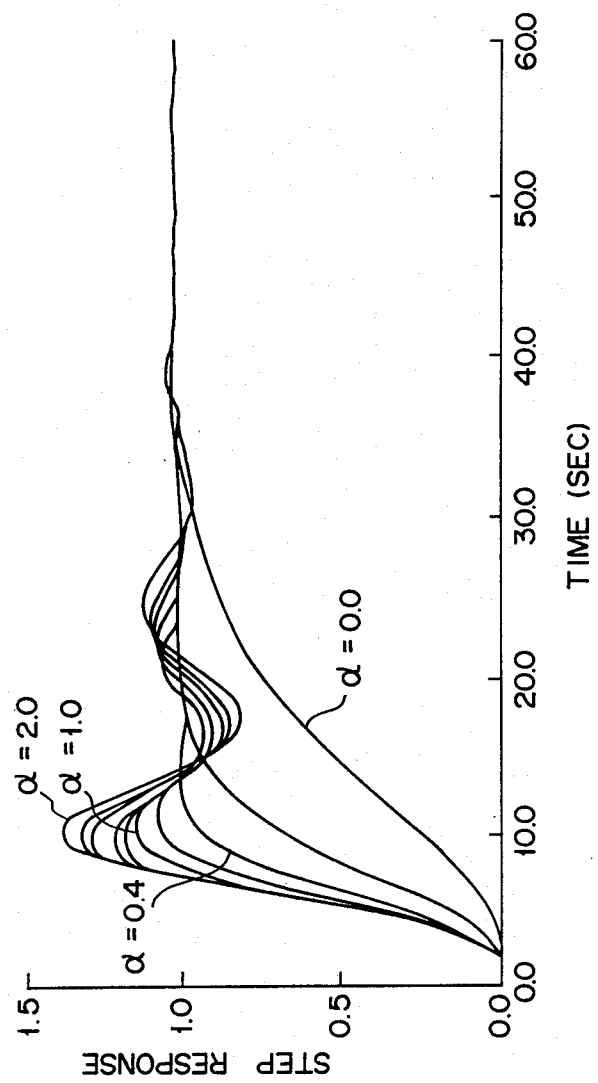
FIG. 5 shows a graph representing the response waveform of the reference model used in the second embodiment.

When the characteristic coefficients $\alpha_2$, $\alpha_3$, $\alpha_4$ of the reference model as given below are by changing $\alpha$, we have a group of step response waveforms as shown in FIG. 5.

$$\begin{aligned} \alpha_2 &= \frac{1}{2}\alpha + \frac{3}{8}(1-\alpha) \\ \alpha_3 &= \frac{3}{20}\alpha + \frac{1}{16}(1-\alpha) \\ \alpha_4 &= \frac{3}{100}\alpha + \frac{1}{64}(1-\alpha) \end{aligned} \quad (22)$$

As seen from the graph, for $\alpha=0.0$, the response waveform is free from the overshoot. For $\alpha=0.4$, the waveform has little overshoot and rises most rapidly. As $\alpha$ is increased above 0.4, the overshoot increases, and at 1.0 of $\alpha$, the overshoot is about 10%.

$\phi_M$/GM calculating circuit 40 receives the characteristic coefficients $\alpha_2$, $\alpha_3$, $\alpha_4$ as selected depending on the response waveforms shown in FIG. 5.

The $\phi_M$/GM calculating circuit 40 calculates the phase margin ($\phi_M$) and the gain margin (GM) through the following mathematical process. Specifically, from the equation (21), we have the loop transfer function $\bar{G}m(s)$ of the reference model as given by $$\bar{G}m(S) = \frac{1}{\sigma S + \alpha_2(\sigma S)^2 + \alpha_3(\sigma S)^3 + \alpha_4(\sigma S)^4} \quad (23)$$

Its frequency response, if $S = j\omega$, is expressed by $$\bar{G}m(j\omega) = \quad (24)$$

$$\frac{e^{-j\frac{x}{2}}}{\sigma\omega[\{1 - a_3(\sigma\omega)^2\} + j\{a_2\sigma\omega - a_2\sigma\omega - a_4(\sigma\omega)^3\}]}$$

Figure 6:
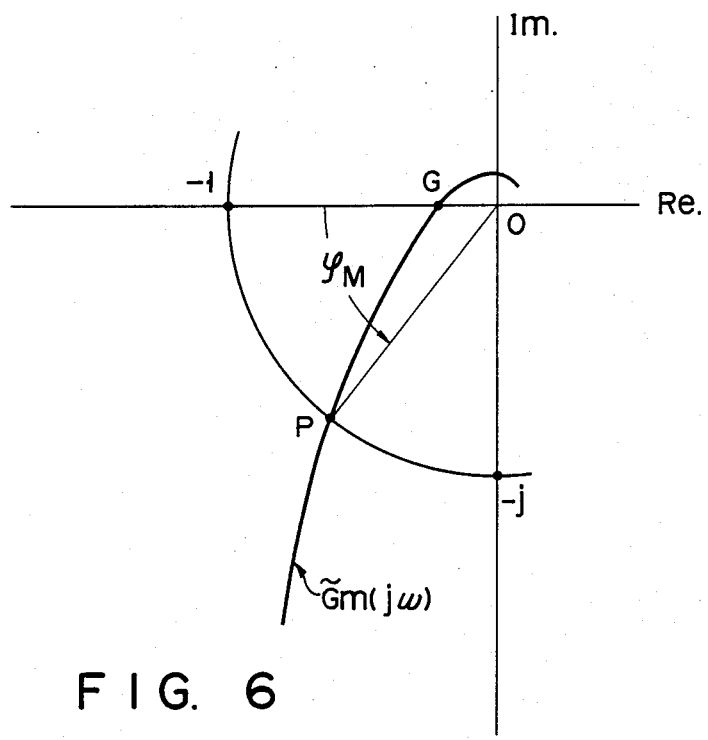
FIG. 6 shows a vector locus of a loop transfer function of the reference model used in the second embodiment.

FIG. 6 shows a vector locus of this $\overline{G}m(j\omega)$ represented on the complex plane. In this plane, the phase margin is represented by angle $\phi_M$ developed between a line connecting origin O and point P where the vector locus crosses a circle with radius 1 centered at origin O, and the negative real part axis.

Since the gain at point P is 1, the equation can be rewritten into $$\{\sigma\omega p - a_3(\sigma\omega p)^3\}^2 + \{a_2(\sigma\omega p)^2 - a_4(\sigma\omega)^4\}^2 = 1 \quad (25)$$

where $\omega p$ is the cross angular frequency at point P. Rearranging the equation (25) with $x = (\sigma\omega p)^2$, we have $$1 - x + (2a_3 - a_2^2)x^2 + (2a_2a_4 - a_3^2)x^3 - a_4^2x^4 = 0 \quad (26)$$

From the equation (26), the positive maximum solution $x_m$ for x is obtained. From the equation (24) and FIG. 6, the phase margin $\phi_M$ is given $$\phi_M = \cos^{-1}(a_2x_m - a_4x_m^2) \quad (27)$$

Similarly, the point G where the vector locus of $\overline{G}m(j\omega)$ shown in FIG. 6 crosses the negative real part axis defines the gain margin GM, and hence the gain margin GM is $$GM = 20 \log_{10}\left(\frac{a_2a_3 - a_4}{a_3^2}\right) \quad (28)$$

The $\phi_M$/GM calculating circuit 40 obtains the positive solution $x_m$ of the equation (26) using the characteristic coefficients $a_2$, $a_3$, $a_4$ of the input reference model, calculates the phase margin $\phi_M$ by the equation (27), and calculates the gain margin GM by the equation (28).

In the controller parameter calculating circuit 42, the controller parameters are obtained in the following way.

It is assumed that the transfer function G(S) of the input process is $$G(S) = \frac{b_0 + b_1S + b_2S^2 + \cdots}{a_0 + a_1S + a_2S^2 + a_3S^2 + \cdots} e^{-lS} \quad (29)$$

where $l$ is the dead time, $a_i(i=0, 1, 2, \ldots)$ is the coefficient of the denominator polynominal, and $b_j(j=0, 1, 2, \ldots)$ is the coefficient of the numerator polynominal. Replacing S with $j\omega$, the frequency characteristic is given by $$G(j\omega) = |G(j\omega)| \cdot e^{-j\theta(\omega)} \quad (30)$$

where $|G(j\omega)|$ is the gain characteristic, and $\theta(\omega)$ is the phase characteristic.

(i) Assuming that the compensation mode used for the process is of the I-PD type, the loop transfer function between the deviation e(t) (=r(t)−y(t)) and the controlled variable y(t) is $$T(S) = \frac{K}{S} \cdot \frac{1}{f_0 + f_1S + G(S)^{-1}} \quad (31)$$

where K is the integration gain, $f_o$ is the proportional gain, and $f_1$ is the derivative gain. Replacing S with $j\omega$ and substituting the equation (30) into the equation (31), we have $$T(j\omega) = \frac{e^{-j\frac{x}{2}}}{\frac{\omega}{K}\left[f_0 + \frac{\cos\theta(\omega)}{|G(j\omega)|} + j\left(\omega f_1 + \frac{\sin\theta(\omega)}{|G(j\omega)|}\right)\right]} \quad (32)$$

As for the vector locus of this function $T(j\omega)$, as in the case of FIG. 6, the phase margin at point P is $\phi_M$, and hence we have $$f_0 + \frac{\cos\theta(\omega p)}{|G(\omega p)|} = \tan\phi_M \cdot \left(\omega p f_1 + \frac{\sin\theta(\omega p)}{|G(j\omega p)|}\right) \quad (33)$$

$$K = \frac{\omega p\left(\omega p f_1 + \frac{\sin\theta(\omega p)}{|G(j\omega p)|}\right)}{\cos\phi_M} \quad (34)$$

where $\omega p$ is the cross angular frequency when the vector locus of $T(j\omega)$ passes point P.

Since the gain margin at point G is GM, the following relations hold $$f_0 + \frac{\cos\theta(\omega G)}{|G(j\omega G)|} = 0 \quad (35)$$

$$\frac{K}{\omega G\left(\omega G \cdot f_1 + \frac{\sin\theta(\omega G)}{|G(j\omega G)|}\right)} = 10^{-\frac{GM}{20}} \quad (36)$$

In the above relations, $\omega_G$ is an angular frequency when the vector locus passes point G. The $\omega p$ to satisfy the equations (33) to (36) is searched with $f_1 = 0$ for the I-P action, and $f_1 = f_0/4$ for the I-P action. The parameters K, $f_0$, and $f_1$ when such angular frequency $\omega p$ is found, are controller parameters satisfying the gain margin GM and the phase margin PH as set.

(ii) When the compensation mode for the process is of the PID type, the loop transfer function T(S) between the deviation e(t) and the controlled variable y(t) is $$T(S) = \left(\frac{C_0 + C_1S + C_2S^2}{S}\right) \cdot G(S) \quad (37)$$

where $C_0$ is the integration gain, $C_1$ the proportional gain, and $C_2$ the derivative gain. Replacing S with $j\omega$, and substituting the equation (30) into the equation (37), we have $$T(j\omega) = \frac{C_0 - C_2\omega^2 + jC_1\omega}{j\omega} \cdot |G(j\omega)|e^{-j\theta(\omega)} \quad (38)$$

Similarly, since the phase margin at point P is $\phi_M$, the following relations hold $$\tan\phi_M = \frac{\cos\theta(\omega p)(C_0 - C_2\omega p^2) + \sin\theta(\omega p) \cdot C_1\omega p}{\sin\theta(\omega p)[C_0 - C_2\omega p^2] - \cos\theta(\omega p) \cdot C_1\omega p} \quad (39)$$

$$\sqrt{\frac{(C_0 - C_2\omega p^2)^2 + (C_1\omega p)^2}{\omega}} \cdot |G(j\omega p)| = 1 \quad (40)$$

Further, since the gain margin at point G is GM, we have $$\tan\theta(\omega_G) = \frac{C_1\omega G^2 - C_0}{C_1\omega G} \quad (41)$$

$$\frac{\sqrt{(C_0 - C_1 \cdot \omega G^2)^2 + (C_1\omega G)^2}}{\omega G} \cdot |G(j\omega_G)| = 10^{-\frac{GM}{20}} \quad (42)$$

The $\omega p$ to satisfy the equations (39) to (42) is searched with $C_2=0$ for the PI action, and $C_2=C_1/4$ for the PID action. The parameters $C_0$, $C_1$, and $C_2$ when such angular frequency is found, are controller parameters satisfying the gain margin GM and the phase margin PH as set.

As described, the controller parameter calculation circuit 42 uses the equations (33) to (36) for the I-PD control system and the equations (39) to (42) for the PID control system, to obtain the controller parameters satisfying the dynamic characteristics of a desired control system.

As seen from the foregoing description, the gain margin GM and the phase margin $\phi_M$ are calculated using the dynamic characteristic of the reference model representing desired dynamic characteristic of the control system. Therefore, the obtained gain and phase margins are those perfectly satisfying the intended response waveform. Then, the gain characteristic and the phase characteristics of the transfer function of the process are used for obtaining the controller parameters. Therefore, the obtained controller parameters well satisfy the gain and phase margins as set. This implies that the zero point and the dead time of the process are inevitably considered for in the control system design. As a result, this control system design has a wider application than the conventional design based on the partial knowledge of the process. The problem of the conventional control system design that the stability of the control system cannot be anticipated in the design stage, has successfully been solved by considering the gain margin and the phase margin.

The description to follow includes the details of correcting the identifying error of the pulse transfer function due to the sampling as referred to in the description of the first embodiment.

Assume now that as the result of identifying the ARMA model, the following pulse transfer function Gp(Z) is obtained $$Gp(Z) = \frac{b_1Z^{-1} + b_2Z^{-2} + \ldots + b_mZ^{-m}}{1 + a_1Z^{-1} + a_2Z^{-2} + \ldots + a_nZ^{-n}}$$

Introducing $e^{\tau s}$ into the time shaft operator Z, the pulse transfer function is transformed into the transfer function Gp($e^{\tau s}$) in the continuous system as given below $$Gp(e^{\tau s}) = \frac{b_1e^{-\tau s} + b_2e^{-2\tau s} + \ldots + b_me^{-m\tau s}}{1 + a_1e^{-\tau s} + a_2e^{-2\tau s} \ldots + a_ne^{-n\tau s}}$$

The following transfer function is used for the transfer function $\Delta^{(4)}(s)$ for compensation.

$$\Delta(s) = \left[1 + \frac{3}{2}(\tau s) + \frac{11}{12}(\tau s)^2 + \frac{1}{4}(\tau s)^3\right] \times$$

$$\frac{[e^{\tau s} - 4 + 6e^{-\tau s} - 4e^{-2\tau s} + e^{-3\tau s}]}{(\tau s)^4}$$

Using the continuous system transfer function Gp($e^{\tau s}$) and the compensation transfer function $\Delta$(s), the gain-frequency characteristic GAIN and the phase-frequency characteristic PHASE can be obtained by $$\begin{array}{ll} \text{GAIN} & = |Gp(e^{j\omega\tau}) \cdot \Delta(j\omega)| \\ \text{PHASE} & = \angle(Gp(e^{j\omega\tau}) \cdot \Delta(j\omega)) \end{array} \quad (\omega_{min} \leq \omega \leq \omega_{max})$$

Figure 7:
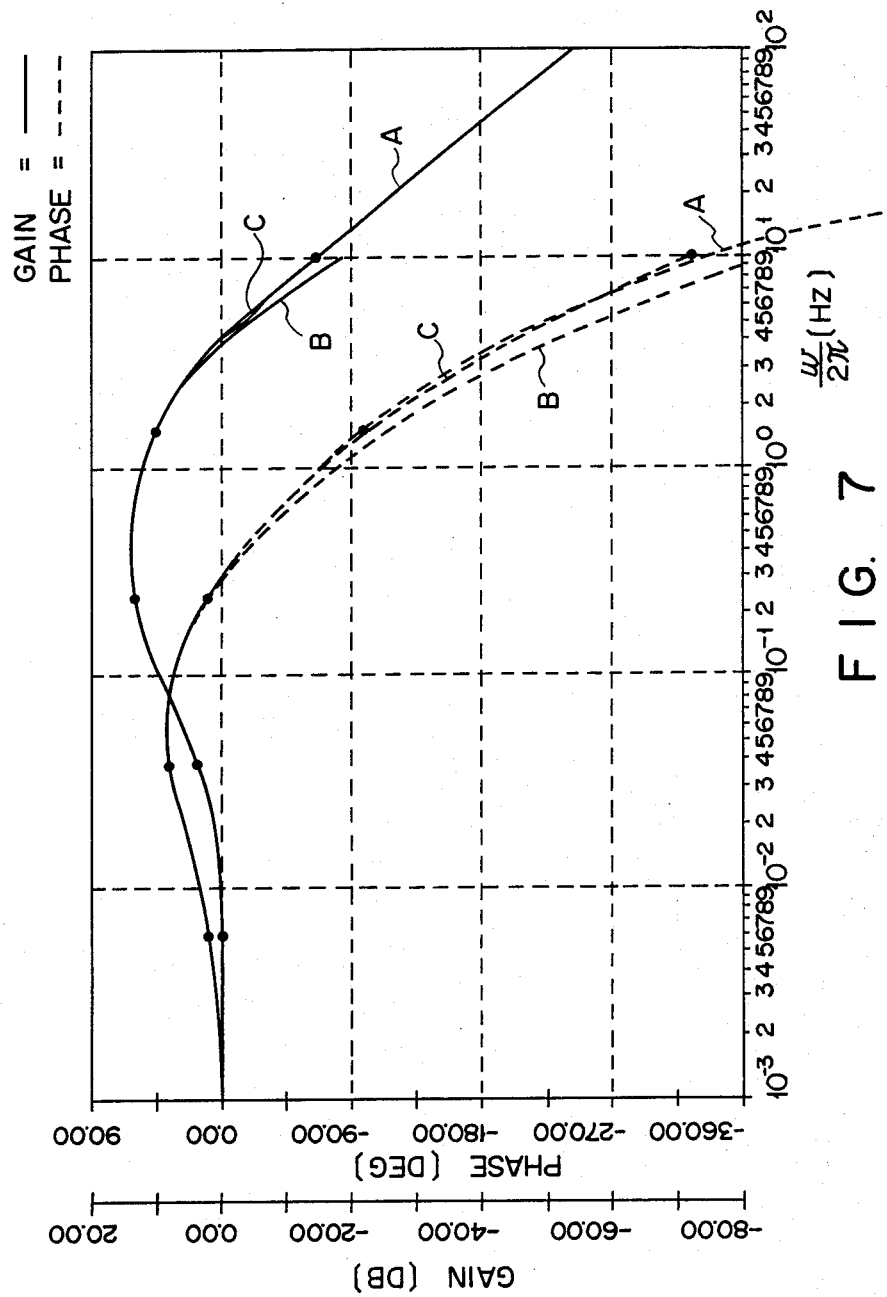
FIG. 7 shows a graph illustrating the effects of the compensation for the adverse influence by the sampling in the frequency characteristics of gain and phase.

FIG. 7 graphically describes the continuous system transfer function G(s) of the process (curve A), the pulse transfer function Gp($Z^{-1}$) (curve B) as identified by using the ARMA model, and the frequency characteristic (curve C) as corrected by the compensation function. In the graph, the continuous line indicates the gain characteristic, and the broken line the phase characteristic.

Assume that the transfer function G(s) in the continuous system is $$G(s) = \frac{(1 + 5s)e^{-0.005S}}{1 + 1.1s + 0.1625s^2 + 0.00625s^3}$$

and the identified pulse transfer function Gp($Z^{-1}$) is $$Gp(Z^{-1}) = \frac{\begin{array}{l}0.7671438Z^{-2} - 0.4363693Z^{-3} - 0.335945Z^{-4} + \\ 0.01586766Z^{-5} - 0.0000006802Z^{-6}\end{array}}{1 - 2.033251Z^{-1} + 1.319083Z^{-2} - 0.2751434Z^{-3}}$$

As seen from FIG. 7, the corrected frequency characteristic (curve C) exactly coincides with the frequency characteristic (curve A) in the continuous system over a wide frequency range from low to high frequencies.

It is evident that the correction of the compensation transfer function is applied up to the fourth order of the term of s, but it may be applied up the any degree of it, if necessary.

The transfer functions for compensating the zeroth order to fourth order are expressed as follows:

$$\Delta^{(0)}(s) = 1$$

$$\Delta^{(1)}(S) = \frac{e^{\tau s} - 1}{\tau s}$$

$$\Delta^{(2)}(S) = \frac{\left(1 + \frac{\tau s}{2}\right)(e^{\tau s} - 2 + e^{-\tau s})}{(\tau s)^2}$$

$$\Delta^{(3)}(S) = \frac{(6 + 6\tau s + 2(\tau s)^2)(e^{\tau s} - 3 + 3e^{-\tau s} - e^{-2\tau s})}{6(\tau s)^3}$$

$$\Delta^{(4)}(S) = \frac{(24 + 36(\tau s) + 22(\tau s)^2 + 6(\tau s)^3)}{24(\tau s)^4} \times$$

$$(e^{\tau s} - 4 + 6e^{-\tau s} - 4e^{-2\tau s} + e^{-3\tau s})$$

As described above, in the adaptive process control system according to this invention, the controller parameters of the control system can be adjusted so as to keep the control system stable, irrespective of the dynamic characteristic of the process, and the drift disturbance and noise, and against an abrupt change of the dynamic characteristics of the process in a certain range.

According to this invention, there is further provided a controller parameter calculation device in use for the adaptive process control system, which allows a designer to select the controller parameters satisfying the desired characteristics of the control system and ensures a good stability of the control system.

Moreover, according to this invention, there is provided a transfer function measuring device which can obtain an exact transfer function in the continuous system from the pulse transfer function which is identified by estimating the parameters of the ARMA model by using the method of least squares.

What is claimed is:

1. An adaptive process control system comprising:
    set point means for generating a set-point signal which represents a target value of a process variable signal of a process to be controlled;
    controller means for generating a manipulating signal which controls the process variable signal in accordance with the set-point signal, the process variable signal, and controller parameters;
    tuning means for superposing a persistently exciting identification signal on at least one of the set-point signal and the manipulating signal;
    frequency characteristic identifying means for estimating an autoregressive moving average model of the process from sampling data of the process variable signal and sampling data of the manipulating signal by using a least square method, during a period in which said tuning means outputs the identification signal, identifying a pulse transfer function of the process, and obtaining a frequency characteristic of gain and phase of the process based on the pulse transfer function; and
    controller parameter calculating means for adjusting the controller parameters of the controller means so that the frequency characteristics of gain and phase satisfy predetermined gain and phase margins.

2. An adaptive process control system according to claim 1, in which said controller means includes an I-P controller with feed forward comprising a feed forward circuit responsive to only the set-point signal, an integrator responsive to a difference between the process variable signal and the set-point signal, and a feedback circuit responsive to only the process variable signal, said I-P controller serving as a P-I controller if the feed forward gain is appropriately adjusted.

3. An adaptive process control system according to claim 1, in which said tuning means includes means for generating said identification signal comprised of one of a Maximum Length Sequence signal, a rectangular wave signal, and a pulse signal.

4. An adaptive process control system according to claim 1, in which said tuning means includes means for generating said identification signal when a difference between the set-point signal and the process variable signal exceeds a threshold.

5. An adaptive process control system according to claim 1, in which said frequency characteristic identifying means includes means for identifying the pulse transfer function of the process using the data in which the sampling data are repeatedly arranged in a time axis direction.

6. An adaptive process control system according to claim 1, in which said frequency characteristic identifying means includes means for correcting an error of the manipulating signal data and the process variable signal data due to the sampling.

7. An adaptive process control system according to claim 1, in which said controller parameter calculating means includes means for designating an overshoot of the process and an attenuation ratio of the process, and means for calculating the controller parameters so that the frequency characteristics of gain and phase satisfy predetermined gain and phase margins, the overshoot, and the attenuation ratio.

8. An adaptive process control system according to claim 1, in which said controller parameter calculating means comprises:
    first calculating means for receiving a characteristic coefficient of a reference model exhibiting a desired response of the adaptive process control system, and calculating gain and phase margins of the reference model; and
    second calculating means for receiving the calculated gain and phase margins from said first calculating means, the frequency characteristics of gain and phase from said frequency characteristic identifying means, and a compensation model signal representing one of an I-PD mode and a PID mode, and calculating the control parameters so that the gain and phase margins of the adapative process control system coincide with those calculated by said first calculating means.

9. An adaptive process control system according to claim 1, in which said frequency characteristic identifying means comprises means for calculating frequency characteristics according to the pulse transfer function, sampling period of the sampling data of the process variable signal and the set-point signal, and a compensation transfer function for removing a difference due to sampling between an identified pulse transfer function and a transfer function in S region.

10. An adaptive process control system comprising:
    means for receiving an input signal to a process and an output signal from the process at a sampling period, and identifying a pulse transfer function using an autoregressive moving average model of the adaptive process control system;
    means for calculating frequency characteristics of gain and phase of the adaptive process control system according to the identified pulse transfer function, the sampling period, and a compensation transfer function and for removing the difference between the pulse transfer function and a transfer function in a continuous system of the adaptive process control system, which is caused by the sampling.

11. An adaptive process control system comprising:

first calculating means for receiving a characteristic coefficient of a reference model exhibiting a desired waveform of a response of the adaptive process control system, and calculating gain and phase margins of the reference model; and second calculating means for receiving the calculated gain and phase margins from said first calculating means, a transfer function of the adaptive process control system, and a signal representing a compensation mode of the adaptive process control system, and for removing the difference so that the gain and phase margins of the adaptive process control system coincide with those calculated by said first calculating means.

12. An adaptive process control system according to claim 11, in which said second calculating means calculates controller parameters depending on an I-PD compensation mode or a PID compensation mode.

* * * * *